(12) United States Patent
Lee

(10) Patent No.: US 10,530,830 B2
(45) Date of Patent: Jan. 7, 2020

(54) APPARATUS AND METHOD FOR ACCESSING WEB IN NETWORK SYSTEM

(71) Applicant: Samsung Electronics Co., Ltd., Gyeonggi-do (KR)

(72) Inventor: Ji-Cheol Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 329 days.

(21) Appl. No.: 14/438,853

(22) PCT Filed: Oct. 25, 2013

(86) PCT No.: PCT/KR2013/009588
§ 371 (c)(1),
(2) Date: Apr. 27, 2015

(87) PCT Pub. No.: WO2014/065633
PCT Pub. Date: May 1, 2014

(65) Prior Publication Data
US 2015/0304384 A1 Oct. 22, 2015

(30) Foreign Application Priority Data

Oct. 25, 2012 (KR) .................. 10-2012-0119282

(51) Int. Cl.
*G06F 15/16* (2006.01)
*H04L 29/08* (2006.01)

(52) U.S. Cl.
CPC ............ *H04L 67/02* (2013.01); *H04L 67/141* (2013.01); *H04L 67/2842* (2013.01)

(58) Field of Classification Search
CPC ... H04L 67/02; H04L 61/1511; H04L 67/141; H04L 67/28; H04L 67/2842; G06F 17/30861

(Continued)

(56) References Cited

U.S. PATENT DOCUMENTS 7,953,820 B2 * 5/2011 Stevens ............. G06F 17/30902
709/219
9,444,905 B2 * 9/2016 Islam .................. H04L 67/2847
(Continued)

FOREIGN PATENT DOCUMENTS

EP 2512101 A1 10/2012
KR 10-2011-0016640 2/2011
WO WO 2012/063100 A1 5/2012

OTHER PUBLICATIONS

International Search Report dated Jan. 24, 2014 in connection with International Patent Application No. PCT/KR2013/009588, 5 pages.

(Continued)

*Primary Examiner* — John B Walsh

(57) ABSTRACT

The present invention relates to an apparatus and a method for accessing the web in a network system in which pre-fetching of web pages is supported. To that end, when DNS processing is requested, a user terminal provides URL information to which a connection is anticipated to a proxy server via a DNS server. The proxy server can, via the DNS server and by means of the URL information received from the user terminal, pre-fetch information about a web page to which a connection is anticipated via a user terminal. That is, the proxy server configures a TCP session with a web server before a TCP session configuration request is received from the user terminal. Furthermore, by acquiring and storing necessary web page information before an HTTP request from the user terminal is received, the proxy server can immediately provide the web page information which has been in storage in response to an HTTP request from the user terminal.

18 Claims, 4 Drawing Sheets

(58) Field of Classification Search
USPC .......................................................... 709/203
See application file for complete search history.

(56) References Cited

U.S. PATENT DOCUMENTS

| | | | | |
|---|---|---|---|---|
| 2002/0055966 A1* | 5/2002 | Border | ............. | G06F 17/30902 709/200 |
| 2002/0062384 A1* | 5/2002 | Tso | ................... | G06F 17/30902 709/229 |
| 2005/0108517 A1* | 5/2005 | Dillon | .............. | G06F 17/30902 713/150 |
| 2005/0256940 A1* | 11/2005 | Henderson | ........ | G06F 17/30902 709/219 |
| 2007/0156845 A1* | 7/2007 | Devanneaux | ..... | G06F 17/30902 709/217 |
| 2008/0208789 A1* | 8/2008 | Almog | ................. | G06N 99/005 706/54 |
| 2008/0235239 A1* | 9/2008 | Penton | .............. | G06F 17/30902 |
| 2009/0100228 A1* | 4/2009 | Lepeska | ............ | G06F 17/30902 711/125 |
| 2010/0011126 A1 | 1/2010 | Hsu et al. | | |
| 2010/0050089 A1* | 2/2010 | Kim | .................. | G06F 17/30899 715/749 |
| 2010/0146415 A1* | 6/2010 | Lepeska | .................. | G06F 17/30 715/760 |
| 2011/0125833 A1* | 5/2011 | Persson | ............... | H04L 67/2823 709/203 |
| 2013/0279414 A1* | 10/2013 | Damola | ............ | H04L 29/12066 370/328 |
| 2014/0040478 A1* | 2/2014 | Hsu | ..................... | H04L 67/1008 709/226 |

OTHER PUBLICATIONS

Written Opinion of International Searching Authority dated Jan. 24, 2014 in connection with International Patent Application No. PCT/KR2013/009588, 5 pages.
Korean Intellectual Property Office, "Notification of the Reasons for Rejection," Application No. KR10-2012-0119282, dated May 13, 2019, 13 pages.

* cited by examiner

URL Hint Extension Format

```
+--+--+--+--+--+--+--+--+--+--+--+--+--+
/           URL Hint Extension         /
+--+--+--+--+--+--+--+--+--+--+--+--+--+
``` where:
 URL Extension   one or more <character-string>s including URL

APPARATUS AND METHOD FOR ACCESSING WEB IN NETWORK SYSTEM

CROSS-REFERENCE TO RELATED APPLICATION(S)

The present application claims priority under 35 U.S.C. § 365 to International Patent Application No. PCT/KR2013/009588 filed Oct. 25, 2013, entitled "APPARATUS AND METHOD FOR ACCESSING WEB IN NETWORK SYSTEM", and, through International Patent Application No. PCT/KR2013/009588, to Korean Patent Application No. 10-2012-0119282 filed Oct. 25, 2012, each of which are incorporated herein by reference into the present disclosure as if fully set forth herein.

TECHNICAL FIELD

The present disclosure relates to an apparatus and method for accessing the web in a network system in which pre-fetching of web pages is supported.

BACKGROUND ART

In general, network systems support a user's connection to a web server based on various kinds of networks. The network systems can be classified into wired network systems and wireless network systems according to the kinds of networks on which the network systems are based.

However, network systems providing web services are generally based on Transmission Control Protocol (TCP)/Internet Protocol (IP) regardless of the kinds of networks.

TCP and IP are communication protocols that are most generally used among the Internet protocol suite. The Internet protocol suite defines a set of communication protocols that nodes such as computers use to transmit/receive information on the Internet. The TCP is a protocol belonging to a transport layer in an Open System Internet (OSI) reference model, and the IP is a protocol belonging to a network layer in the OSI model.

The TCP/IP is applied in a wireless network as well as a wired network, in the same fashion. The IP can be classified into the case of using a fixed IP and the case of using a floating IP.

Most of network systems uses a Hypertext Transfer Protocol (HTTP) to connect to a web server. The HTTP is a request/response protocol that is executed between a client and a server in order to transmit/receive information on the web. The HTTP is a protocol belonging to an application layer in the OSI reference model.

For example, a web browser, which is a client, requests a server to send web pages or image information through the HTTP. The server provides the requested information to the web browser in response to the request from the web browser.

As a security-enhanced version of the HTTP, a Hypertext Transfer Protocol over Secure Socket Layer (HTTPS) has been developed for communication authentication and encryption. The HTTPS is widely used in electronic commerce.

The HTTPS encodes session data through a Secure Socket Layer (SSL) or Transport Layer Security (TLS) protocol, instead of using general text for socket communications. Accordingly, the HTTPS secures appropriate protection of data. For example, the standard TCP/IP port of the HTTPS is 443.

Generally, Uniform Resource Locators (URLs) of web pages using the HTTP start with "http://", and URLs using the HTTPS start with "https://".

FIG. 1 shows a procedure for calling a web page according to a request from User Equipment (UE) in a typical network system.

As shown in FIG. 1, the procedure for calling a web page according to a request from UE is composed of Domain Name System (DNS) transaction operation, TCP session establishment operation, and HTTP request/response operation.

In the DNS transaction operation, a web browser included in UE acquires an IP address from a DNS server. In the TCP session establishment operation, the web browser included in the UE establishes a TCP session with a specific web server for HTTP connection. In the HTTP request/response operation, the web browser included in the UE transmits and receives information to open a desired web page.

In the following description, although a main agent for specific operation is mentioned as UE, operation for opening a web page should be interpreted to be performed by a web browser being executed on UE.

In the procedure described above, in order for UE to open a desired web page, Round Trip Time (RTT) is generated at least three times. As shown in FIG. 1, Ta is generated one time, and Tc is generated two times. The Ta is RTT that is anticipated between the UE and the DNS server due to the DNS transaction operation, and the Tc is RTT that is anticipated between the UE and the web server due to the TCP session establishment operation or HTTP request/response operation. The Tc includes RTT that is anticipated between the UE and the proxy server, and RTT (that is, Tb) that is anticipated between the proxy server and the web server. Since the Tb is anticipated to be generated in both the TCP session establishment operation and the HTTP request/response operation, the procedure of calling the web page includes Tb two times.

Accordingly, the total T of RTT in a general procedure for calling a web page can be defined as "Ta+2*(Ta+Tb)". For example, if each of "Ta" and "Tb" is assumed to be 100 ms, the total T of RTT will be 500 ms.

Accordingly, in order to increase a user's convenience, a method for reducing RTT that is generated in a general procedure for calling the web is needed.

DISCLOSURE

Technical Problem

Embodiments of the present disclosure propose an apparatus and method for accessing the web by pre-fetching a web page using an extension parameter, in order to reduce a time required for loading a web page in a network system.

Also, embodiments of the present disclosure propose an apparatus and method for accessing the web by transferring Uniform Resource Locator (URL) that User Equipment (UE) is anticipated to access when the UE requests an Internet Protocol (IP) address, so that a proxy server can pre-fetch a web page in a network system.

Also, embodiments of the present disclosure propose an apparatus and method for accessing the web by transferring URL to which UE is to connect to a Domain Name System (DNS) server in advance, and enabling the DNS server to interwork with a proxy server to connect to a web server corresponding to the received URL in advance and to pre-fetch information about a web page to which the UE is anticipated to access, in a network system.

Technical Solution

In accordance with an aspect of exemplary embodiments of the present disclosure, there is provided a method in which user equipment with a predetermined web browser installed therein accesses a web page through an internal network, the method including: providing, when requesting a domain name server to send an Internet Protocol (IP) address, Unique Resource Locator (URL) that the user equipment is anticipated to access to the domain name server, receiving the IP address as a response to the request from the domain name server, then establishing a Transmission Control Protocol (TCP) session with a proxy server to access a web page corresponding to the URL to which the user equipment is anticipated to access.

In accordance with another aspect of exemplary embodiments of the present disclosure, there is provided an apparatus of enabling user equipment with a predetermined web browser installed therein to access a web page through an internet network, the apparatus including: a communication unit configured to communicate with a domain name server and a proxy server through the internal network, in order to access the web page; and a controller configured to control the communication unit to provide, when requesting a domain name server to send an Internet Protocol (IP) address, Unique Resource Locator (URL) that the user equipment is anticipated to access to the domain name server, to receive the IP address as a response to the request from the domain name server, and to then establish a Transmission Control Protocol (TCP) session with the proxy server to access a web page corresponding to the URL that the user equipment is anticipated to access.

In accordance with another aspect of exemplary embodiments of the present disclosure, there is provided a method in which a proxy server supports user equipment with a predetermined web browser installed therein to access a web page, the method including: receiving Uniform Resource Locator (URL) provided when an Internet Protocol (IP) address is requested from the user equipment, from a domain name server, and acquiring information of a web page that the user equipment is anticipated to access, in advance, based on the URL, before receiving a Transmission Control Protocol (TCP) session request and a Hypertext Transfer Protocol (HTTP) request from the user equipment.

In accordance with another aspect of exemplary embodiments of the present disclosure, there is provided an apparatus in which a proxy server supports user equipment with a predetermined web browser installed therein to access a web page, the apparatus including: a communication unit configured to communicate with the user equipment, a domain name server, and a web server, in order to support the user equipment to access a web page; and a controller configured to receive Uniform Resource Locator (URL) provided when an Internet Protocol (IP) address is requested from the user equipment, through the domain name server, and to acquire information of a web page that the user equipment is anticipated to access, in advance, based on the received URL, before receiving a Transmission Control Protocol (TCP) session request and a Hypertext Transfer Protocol (HTTP) request from the user equipment.

In accordance with another aspect of exemplary embodiments of the present disclosure, there is provided a method in which a domain name server supports user equipment with a predetermined web browser installed therein to access a web page, the method including: receiving Uniform Resource Locator (URL) that the user equipment is anticipated to access, from the user equipment, when an Internet Protocol (IP) address is requested, and when an IP address is allocated to the user equipment in response to the IP address request, transferring the URL to a proxy server so that the proxy server establishes a Transmission Control Protocol (TCP) session with a target web server recognized by the URL.

In accordance with another aspect of exemplary embodiments of the present disclosure, there is provided an apparatus in which a domain name server supports user equipment with a predetermined web browser installed therein to access a web page, the apparatus including: a communication unit configured to communicate with the user equipment and a proxy server, in order to support the user equipment to access a web page; and a controller configured to control the communication unit to receive Uniform Resource Locator (URL) that the user equipment is anticipated to access, from the user equipment, when an Internet Protocol (IP) address is requested, and to transfer the URL to a proxy server when an IP address is allocated to the user equipment in response to the IP address request, so that the proxy server establishes a Transmission Control Protocol (TCP) session with a target web server recognized by the URL.

Advantageous Effects

The present disclosure has the following effects.

According to embodiments of the present disclosure, by enabling a proxy server to call a web page that User Equipment (UE) is anticipated to access, in advance, in a network system, it is possible to reduce a time taken to access a web page.

Other effects that may be obtained or expected from embodiments of the present disclosure are explicitly or implicitly disclosed in the description of the embodiment of the present disclosure. That is, various effects expected from the embodiments of the present disclosure have been disclosed in the detailed description of the present disclosure.

MODE FOR INVENTION

Figure 1:
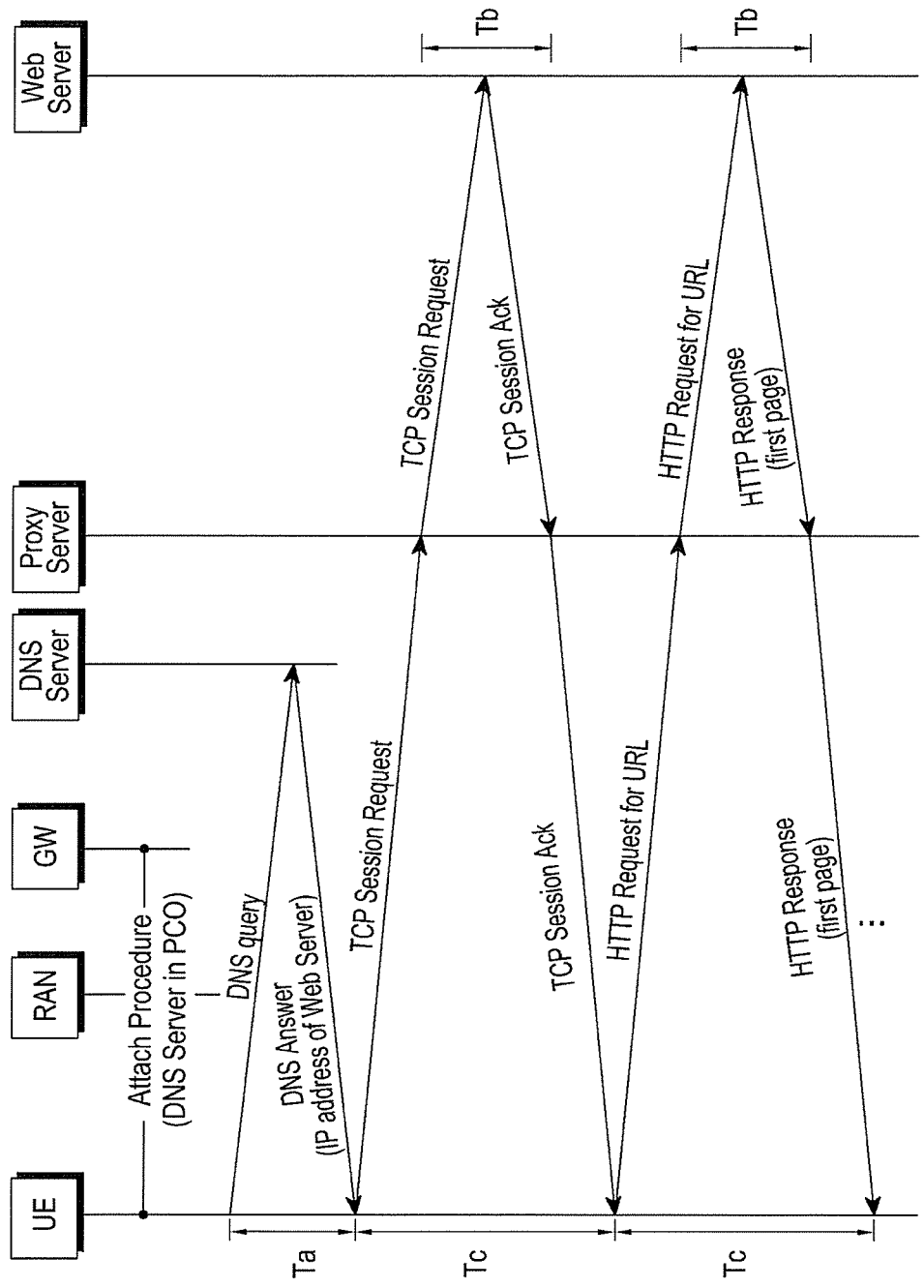
FIG. 1 shows a procedure for accessing a web page in a typical network system.

In the following detailed description according to the present disclosure, representative embodiments for achieving the technical solutions will be suggested. Also, for convenience of description, the same or similar components are termed as the same names. However, the names used for convenience of description are not intended to limit the scope of the present disclosure, and the present disclosure can also be applied to any other system having the similar technical background in the same fashion or with a slight modification.

In embodiments of the present disclosure which will be described below, by providing, when User Equipment (UE) issues a Domain Name System (DNS) query, URL information that the UE is anticipated to access to a proxy server, the proxy server can pre-fetch information about a web page that the UE is anticipated to access. For example, the URL information that the UE is anticipated to access may be provided to the proxy server through a DNS server.

Accordingly, the proxy server may establish a Transmission Control Protocol (TCP) session with a target web server in advance before receiving a TCP session request from the UE. Thereby, a time delay from when the proxy server receives a TCP session request from the UE until the proxy server responses to the TCP session request can be prevented.

Also, before receiving a HTTP request from the UE, the proxy server may perform HTTP request/response operation with the target web server. The HTTP request is issued by the UE to access an arbitrary web page. Thereby, a time delay from when the proxy server receives a HTTP request until the proxy server responses to the HTTP request may be prevented.

Hereinafter, preferred embodiments of the present disclosure will be described in detail with reference to the accompanying drawings. In this specification, the same reference numerals are used throughout the different drawings to designate the same components. Further, when it is determined that the detailed description of the known art related to the present disclosure may obscure the gist of the present disclosure, the detailed description will be omitted.

Figure 2:
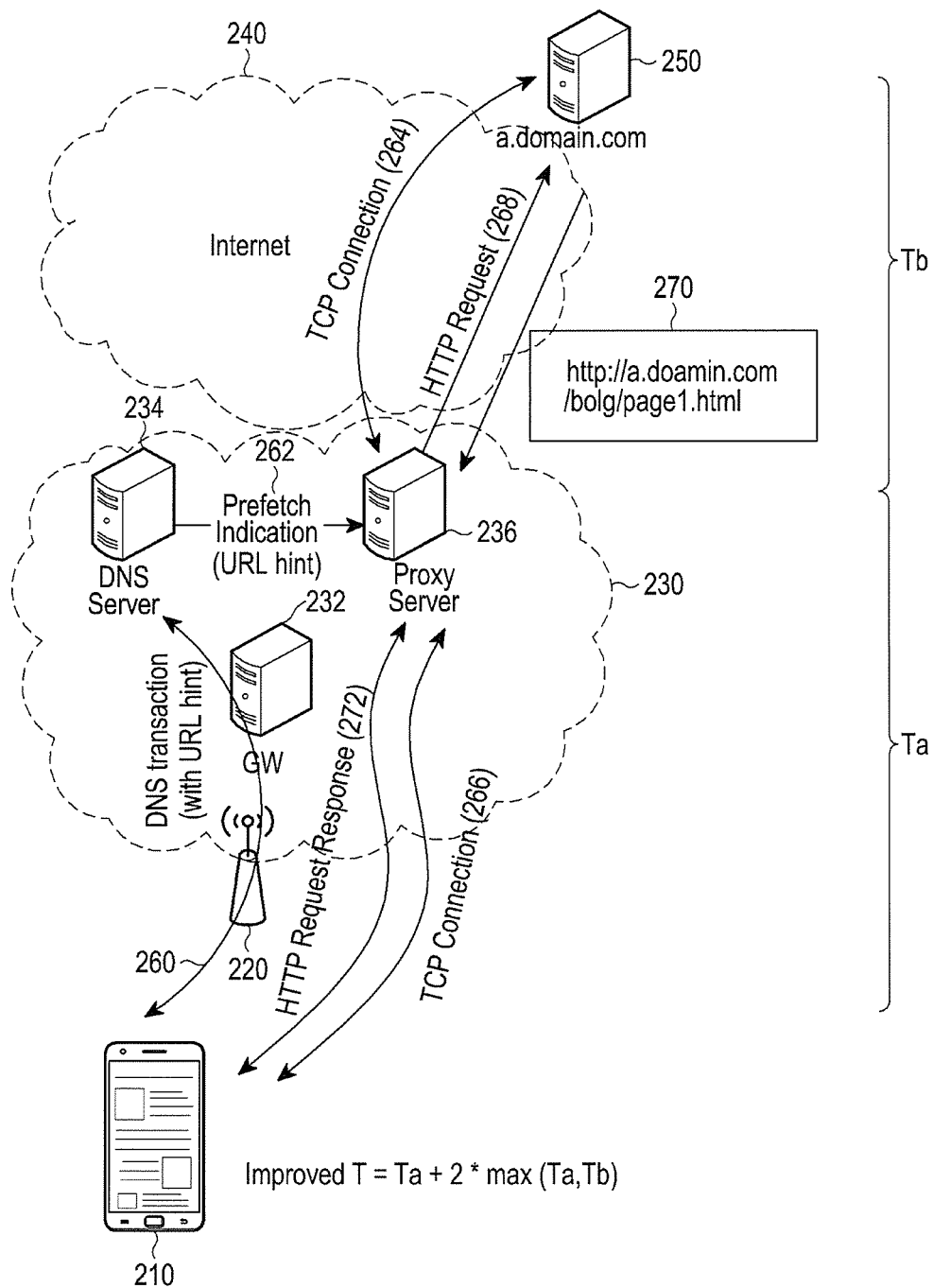
FIG. 2 shows a configuration of a network system according to an embodiment of the present disclosure.

FIG. 2 shows a configuration of a network system according to an embodiment of the present disclosure. In FIG. 2, it is assumed that a proxy server 236 operates based on interworking with an internal network 230 and the Internet 240.

In FIG. 2, the proxy server 236 and a Domain Name System (DNS) server 234 are located between a client (for example, a web browser) of User Equipment (UE) 210 and a web server 250. The DNS server 234 may interwork with the proxy server 236.

In FIG. 2, the proxy server 236 and the DNS server 234 are shown to be present in a mobile operator's network, however, the proxy server 236 and the DNS server 234 may be present in another kind of network than the mobile operator's network.

Referring to FIG. 2, the UE 210 may install a web browser therein, and can access a desired web page by driving the web browser. More specifically, the UE 210 may access a desired web page through a web page calling procedure including DNS transaction operation, TCP session establishment operation, and HTTP request/response operation.

More specifically, the UE 210 may perform DNS transaction with the DNS server 234 through a base station 220 and a gateway (GW) 232, in operation 260. That is, the UE 210 may request the DNS server 234 to allocate an IP address (DNS query). At this time, the UE 210 may transmit Hint for identifying a web page which the UE 210 is anticipated to access, to the DNS server 234. The Hint is information to help identify a web page that the UE 210 is anticipated to access. For example, the Hint may be an address (that is, URL information) of a home page that the UE 210 is anticipated to access.

Figures 4, 5:
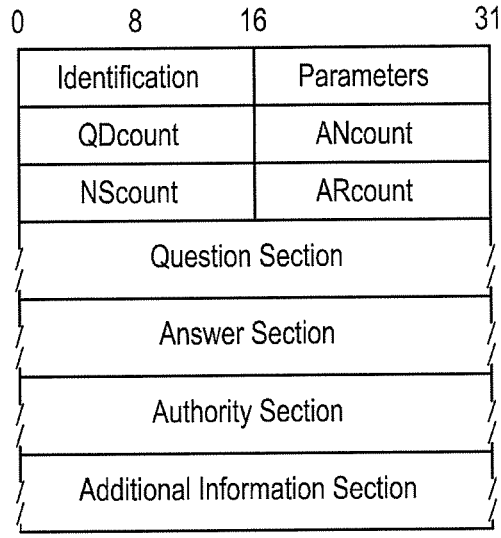
FIG. 4 shows an example of a Domain Name System (DNS) query message that is used by User Equipment (UE) to request allocation of an Internet Protocol (IP) address, according to an embodiment of the present disclosure.
FIG. 5 shows an example of Hint for identifying a web page that UE is anticipated to access, according to an embodiment of the present disclosure.

FIG. 4 shows an example of a DNS query message that is used by the UE 210 to request allocation of an Internet Protocol (IP) address, according to an embodiment of the present disclosure. In FIG. 4, "Additional Resource Record" that is recorded in an "Additional Information Section" field includes "URL Hint Extension". The "URL Hint Extension" corresponds to information (that is, Hint) to help identify a web page that the UE 210 is anticipated to access.

FIG. 5 shows an example of Hint to help identify a web page that UE is anticipated to access, according to an embodiment of the present disclosure. In FIG. 5, a format of "URL Hint Extension" that can be included in "Additional Resource Record" is shown. For example, the content of Hint by "URL Hint Extension" may be URL information such as The UE 210 may receive an IP address allocated by the DNS server 234 in response to a DNS query requesting allocation of an IP address.

After receiving the IP address, the UE 210 may perform TCP session establishment with the proxy server 236, in operation 266. If the UE 210 receives the IP address, the UE 210 may request the proxy server 236 to establish a TCP session. The UE 210 may receive a TCP session acknowledge signal ACK from the proxy server 236 as a response to the request for establishing a TCP session.

After requesting the proxy server 236 to establish a TCP session with the target web server 250, the UE 210 may set a time of a timer. Setting a time of the timer is aiming at measuring a response waiting time taken to response to the TCP session request. The time of the timer is set in consideration of Round Trip Time (RTT) between the UE 210 and the proxy server 236, except for RTT between the proxy server 236 and the web server 250 for processing the TCP session request. Since the proxy server 236 has already established a TCP session with the target web server 250 when the UE 210 requested the proxy server 236 to establish a TCP session, the proxy server 236 can provide a TCP session acknowledge signal ACK to the UE 210 without Round Trip Delay (RTD, corresponding to "Tb" according to the related art).

After the TCP session establishment is completed, the UE 210 may perform HTTP request/response operation with the proxy server 236, in operation 272. That is, after receiving the TCP session acknowledge signal ACK, the UE 210 may send a HTTP request for requesting the proxy server 236 to provide a web page corresponding to specific URL based on HTTP. Thereafter, the UE 210 may receive web page information pre-fetched by the proxy server 236 as a response to the HTTP request, from the proxy server 236, and provide the web page information to a user.

After sending the HTTP request to the proxy server 236, the UE 210 may set a time of the timer to measure a response waiting time taken to response to the HTTP request. The time of the timer may be set in consideration of RTT between the UE 210 and the proxy server 236, except for RTT between the proxy server 236 and the target web server 250 for processing the HTTP request. Since the proxy server 236 has already pre-fetched desired web page information when the UE 210 sends the HTTP request to the proxy server 236, the proxy server 236 can provide the web page information to the UE 210 without RTD (corresponding to "Tb" according to the related art).

In order to perform operations as described above, the UE 210 may include a communication unit to communicate with the DNS server 234 and the proxy server 236 through the internal network 230 in order to access web pages, and a controller to control overall operations for accessing web pages.

The controller may control, when the UE 210 requests the DNS server 234 to send an IP address, the communication unit to provide URL corresponding to a web page that the UE 210 is anticipated to access. The controller may receive the IP address from the DNS server 234 as a response to the request, and then control the communication unit to establish a TCP session with the proxy server 236 to access a web page corresponding to URL that the UE 210 is anticipated to access.

The DNS server 234 may change a domain name of a host to a network address of the host and vice versa. That is, the DNS server 234 may convert a domain name that human can easily recognize to an identification address (IP address) consisting of numerals, in order to search for an address of a specific computer (for example, the web server 250). For example, the DNS server 234 may convert a domain name of a main computer, such as "www.example.com", to an IP address such as "192.168.1.0", based on an TCP/IP application as an Internet domain address system.

When the DNS server 234 receives the DNS query requesting allocation of an IP address from the UE 210 in operation 260 for DNS transaction, the DNS server 234 may receive URL information that the UE 210 is anticipated to access, from the UE 210. When the DNS server 234 allocates an IP address, the DNS server 234 may provide the URL information received from the UE 210 to the proxy server 236, in operation 262. Then, the DNS server 234 may provide the allocated IP address to the UE 210.

The reason why the DNS server 234 transfers URL information to the proxy server 236 when allocating an IP address is to enable the proxy server 236 to use the URL information to in advance establish a TCP session with the target web server 250 providing a web page that the UE 210 is anticipated to access.

In order to perform operations as described above, the DNS server 234 may include a communication unit to communicate with the UE 210 and the proxy server 236, and a controller to control overall operations for supporting the UE 210 to access web pages.

When the controller receives a DNS query requesting allocation of an IP address from the UE 210, the controller may receive URL information of a web page that the UE 210 is anticipated to access, and control the communication unit to transfer the URL information to the proxy server 236 when an IP address is allocated to the UE 210 in response to the DNS query.

The proxy server 236 may receive the URL information from the DNS server 234, in operation 262. The proxy server 236 may establish a TCP session with the web server 250 recognized based on the received URL information, in operation 264.

In summary, the proxy server 236 may recognize, before receiving a TCP session request from the UE 210, the target web server 250 using the URL information received from the DNS server 234, and establish a TCP session with the target web server 250.

Accordingly, when the proxy server 236 receives a TCP session request from the UE 210, the proxy server 236 may establish a TCP session with the UE 210 based on the TCP session established in advance with the web server 250, in operation 266. Thereby, a time delay from when the proxy server 236 receives the TCP session request from the UE 210 until the proxy server 236 establishes the TCP session with the web server 250 can be prevented.

That is, since the proxy server 236 has already established a TCP session with the target web server 250 before receiving a TCP session request from the UE 210, the proxy server 236 can establish a TCP session with the UE 210 without RTD (corresponding to "Tb" according to the related art) for TCP session establishment.

The proxy server 236 may acquire, when receiving the TCP session request from the UE 210, information about a web page that the UE 210 is anticipated to access, in advance, through HTTP request/response operations (operations 268 and 270) with the target web server 250 using the URL information received from the DNS server 234.

The proxy server 236 may receive a HTTP request from the UE 210, and provide the web page information acquired in advance as a response to the HTTP request, to the UE 210, in operation 272.

Accordingly, a time delay from when the proxy server 236 receives a HTTP request from the UE 210 until the proxy server 236 acquires web page information requested by the UE 210 can be prevented.

That is, since the proxy server 236 has pre-fetched desired web page information from the target web server 250, the proxy server 236 can provide the desired web page information to the UE 210, without RTD (corresponding to "Tb" according to the related art).

In order to perform operations described above, the proxy server 236 may include a communication unit to communicate with the UE 210, the DNS server 234, and the target web server 250, and a controller to perform overall operations for supporting the UE 210 to access web pages.

The controller may receive URL information provided when allocation of an IP address is requested from the UE 210, from the DNS server 234, and establish a TCP session with the target web server 250 recognized based on the URL information, before receiving a TCP session request from the UE 210. For example, just after the controller receives URL information from the UE 210, the controller may recognize the target web server 250 using the URL information, and establish a TCP session with the target web server 250.

The controller may establish a TCP session with the target web server 250, request the target web server 250 to send HTTP, and acquire web page information corresponding to the URL information in advance, before receiving a HTTP request from the UE 210. For example, when a TCP session request is received from the UE 210, the controller may receive a desired web page from the web server 250 based on the URL information received in advance.

Figure 3:
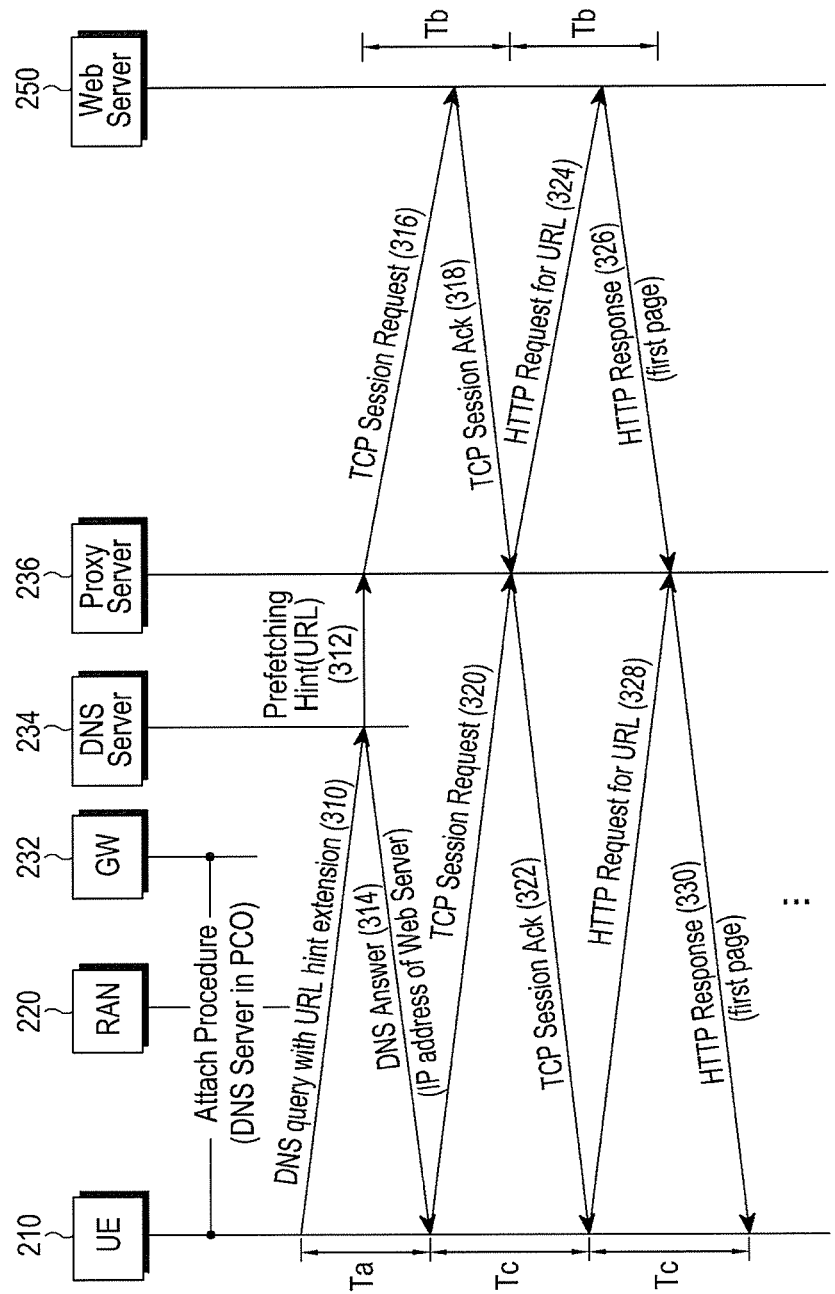
FIG. 3 shows a procedure for accessing a web page in a network system according to an embodiment of the present disclosure.

FIG. 3 shows a procedure for accessing a web page in a network system according to an embodiment of the present disclosure.

Referring to FIG. 3, the UE 210 may perform an attach procedure for connecting to a gateway (GW) 232. The attach procedure may be performed by the DNS server 234 according to Protocol Configuration Option (PCO).

The UE 210 may transmit a DNS query requesting allocation of an IP address to the DNS server 234, in operation 310. At this time, the UE 210 may provide Hint for identifying a web page that the UE 210 is anticipated to access, to the DNS server 234. The Hint is information to help identify a web page that the UE 210 is anticipated to access. For example, the Hint may be an address (that is, URL information) of a home page that the UE 210 is anticipated to access.

The DNS server 234 which received the Hint (for example, URL information) together with the DNS query, may transfer the URL information received as the Hint to the proxy server 236, in order to pre-fetch information about a web page that the UE 210 is anticipated to access, in operation 312. For example, the URL information is transmitted to the proxy server 236 under an assumption that an IP address is allocated in response to an IP address request from the UE 210. That is, the URL information is transmitted to the proxy server 236 only when an IP address is allocated in response to an IP address request from the UE 210.

The DNS server 234 may provide an IP address of a web server allocated in response to an IP address request from the UE 210, in operation 314.

The proxy server 236 may recognize the target web server 250 using the URL information received from the DNS server 234, and perform a procedure for establishing a TCP session with the target web server 250, in operations 316 and 318. The target web server 250 may be a web server providing a web page that the UE 210 is anticipated to access.

Thereby, the proxy server 236 may acquire, before receiving a TCP session request from the UE 210, information about a web page that the UE 210 is anticipated to access, in advance, based on the URL information received from the proxy server 236.

The procedure for establishing a TCP session may be performed in such a way that the proxy server 236 requests the target web server 250 to establish a TCP session in operation 316, and the web server 250 provides a TCP session acknowledge signal ACK to the proxy server 236 in operation 318. Accordingly, a TCP session between the proxy server 236 and the target web server 250 may be established by the procedure of operations 316 and 318.

The UE 210 which received the IP address may request the proxy server 236 to establish a TCP session, in operation 320. The proxy server 236 which received the TCP session request from the UE 210 may transmit a TCP session acknowledge signal ACK to the UE 210 based on the TCP session established with the target web server 250, in operation 322. At this time, since the proxy server 236 has already established a TCP session with the web server 250, the proxy server 236 can provide a TCP session acknowledge signal ACK to the UE 210 without RTD (corresponding to "Tb" according to the related art).

When receiving a TCP session request from the UE 210, the proxy server 236 may perform HTTP request/response operations with the web server 250, in operations 324 and 326. The proxy server 236 may access the target web server 250 based on HTTP, and receive web page information using the URL information received from the DNS server 234.

More specifically, the proxy server 236 may request the target web server 250 to provide a web page that the UE 210 is anticipated to access, through the TCP session established with the web server 250 using the URL information received from the DNS server 234, in operation 324. The target web server 250 may provide web page information corresponding to the URL information provided from the proxy server 236, to the proxy server 236, in operation 326. For example, the web page information that is provided from the target web server 250 to the proxy server 236 may be information written by "html".

Accordingly, the proxy server 236 may pre-fetch and store web page information that the UE 210 is anticipated to access.

The UE 210 which received the TCP session acknowledge signal ACK may request the proxy server 236 to provide a web page corresponding to the URL based on HTTP, in operation 328. The proxy server 236 which received the request from the UE 210 may provide the pre-fetched web page information as a response to the request to the UE 210, in operation 330. At this time, since the proxy server 236 has already received the web page information from the target web server 250, the proxy server 236 can provide the web page information to the UE 210 without RTD (corresponding to "Tb" according to the related art). However, if a web page requested by the UE 210 is not identical to the pre-fetched web page, RTD (corresponding to "Tb" according to the related art) may be generated.

Accordingly, the proxy server 236 needs to determine whether the URL information received in the DNS transaction operation (operations 310 and 312) is identical to the URL information received in the HTTP request/response operation (operation 328). The reason is because the URL information received in the DNS transaction operation, corresponding to a web page that the UE 210 is anticipated to access, may be different from URL information of a web page requested in the HTTP request/response operation.

Accordingly, when the URL information provided in advance is identical to requested URL information, the proxy server 236 may provide the pre-fetched web page information to the UE 210.

For example, the total T of RTT in the procedure for calling a web page may be defined as "Ta+2*max (Ta, Tb)". Herein, "max(Ta, Tb)" means the greater value of Ta and Tb. For example, if both "Ta" and "Tb" are 100 ms, the total T of RTT will be 300 ms. This result shows that a time delay of 200 ms can be reduced than 500 ms which is the total T of RTT by a procedure of calling a web page according to the related art under the same condition as the above example.

Meanwhile, if the URL information provided in advance is not identical to the requested URL information, the proxy server 236 needs to again receive desired web page information from the target web server 250 using the requested URL information. In this case, the total T of RTT in the procedure for calling a web page may be defined as "2*Ta+2*max(Ta, Tb)". For example, if both "Ta" and "Tb" are 100 ms, the total T of RTT will be 400 ms. This result shows that a time delay of 100 ms can be reduced than 500 ms which is the total T of RTT by the procedure for calling the web page according to the related art under the same condition as the above example.

It will be appreciated that the embodiments of the present invention as described above can be realized in the form of hardware, firmware, software or any combination thereof. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable, machine (for example, computer)-readable medium such as, for example, a CD, DVD, magnetic disk or magnetic tape.

The apparatus and method according to the present disclosure may be implemented as a computer or a mobile terminal including a controller and a memory. The memory is an example of machine-readable storage medium that is suitable to store a program(s) including instructions for implementing the embodiments of the present disclosure. Accordingly, the present disclosure includes a program including code for implementing the apparatus or method written in arbitrary claims of this specification, and machine (computer or the like)-readable storage medium that stores such a program. Moreover, such a program can be electronically transported through arbitrary media such as communication signals that are transmitted through a wired or wireless connection, and an embodiment includes this and an equivalent thing appropriately.

The invention claimed is:

1. A method in which a user equipment accesses a web page through a network, the method comprising:
   transmitting, by the user equipment to a domain name server, a request message including a unique resource locator (URL) that corresponds to the web page which the user equipment is anticipated to access, wherein the request message includes a request for sending an internet protocol (IP) address;
   receiving, by the user equipment, the IP address as a response to the request message from the domain name server;
   transmitting, by the user equipment, a transmission control protocol (TCP) session request to a proxy server for establishing a TCP session between the user equipment with the proxy server to access the web page corresponding to the URL;
   setting a time of a timer in consideration of round trip time (RTT) between the user equipment and the proxy server, except for RTT between the proxy server and a web server for processing the request, in order to measure a response waiting time taken to respond to the request; and
   receiving, by the user equipment, a TCP session acknowledge from the proxy server, wherein the URL is forwarded to the proxy server by the domain name server before the user equipment transmits the TCP session request to the proxy server,
   wherein a TCP session is established between the proxy server with the web server based on the URL before the user equipment transmits the TCP session request to the proxy server,
   wherein the TCP session between the user equipment with the proxy server is established based on the TCP session between the proxy server with the web server established before the user equipment transmits the TCP session request to the proxy server, and
   wherein information of the web page that the user equipment is anticipated to access is transmitted through the TCP session between the proxy server with the web server.

2. The method according to claim 1, further comprising:
   acquiring the IP address from the domain name server; and
   accessing the web page provided by the web server through the proxy server based on hypertext transfer protocol (HTTP).

3. A user equipment to access a web page through a network, the user equipment comprising: a memory configured to store executable instructions; and
   a processor operably coupled to the memory, wherein the executable instructions cause the processor to:
   communicate with a domain name server and a proxy server through the network, in order to access the web page; and
   transmit to the domain name server, a request message including a unique resource locator (URL) that corresponds to the web page which the user equipment is anticipated to access, wherein the request message includes a request for sending an internet protocol (IP) address,
   receive the IP address as a response to the request message from the domain name server,
   transmit a transmission control protocol (TCP) session request to the proxy server for establishing a TCP session between the user equipment with the proxy server to access the web page corresponding to the URL,
   to set a time of a timer in consideration of round trip time (RTT) between the user equipment and the proxy server, except for RTT between the proxy server and a web server for processing the request, in order to measure a response waiting time taken to respond to the request, and
   receive a TCP session acknowledge from the proxy server,
   wherein the URL is forwarded to the proxy server by the domain name server before the user equipment transmits the TCP session request to the proxy server,
   wherein a TCP session is established between the proxy server with the web server based on the URL before the user equipment transmits the TCP session request to the proxy server,
   wherein the TCP session between the user equipment with the proxy server is established based on the TCP session between the proxy server with the web server established before the user equipment transmits the TCP session request to the proxy server, and
   wherein information of the web page that the user equipment is anticipated to access is transmitted through the TCP session between the proxy server with the web server.

4. The user equipment according to claim 3, wherein the processor is further configured to:
   acquire the IP address from the domain name server; and
   access the web page provided by the web server through the proxy server based on hypertext transfer protocol (HTTP).

5. A method in which a proxy server supports a user equipment to access a web page, the method comprising:
   receiving, by the proxy server, a uniform resource locator (URL) that the user equipment is anticipated to access for establishing a transmission control protocol (TCP) session between the proxy server and a web server, from a domain name server;
   transmitting, by the proxy server, a TCP session request to the web server for establishing the TCP session with the web server;
   receiving, by the proxy server, a TCP session acknowledge from the web server;
   receiving, by the proxy server, a TCP session request from the user equipment for establishing the TCP session between the proxy server and the user equipment; and
   transmitting, by the proxy server, a TCP session acknowledge to the user equipment based on the TCP session between the proxy server and the web server,
   wherein the URL is forwarded to the proxy server by the domain name server before the proxy server receives the TCP session request from the user equipment,
   wherein the proxy server establishes a TCP session between the proxy server with the web server based on the URL before the proxy server receives the TCP session request from the user equipment,
   wherein the TCP session between the proxy server and the user equipment is established based on the TCP session between the proxy server with the web server established before the proxy server receives the TCP session request from the user equipment, wherein the proxy server acquires information of the web page that the user equipment is anticipated to access through the TCP session with the web server, and wherein a timer for a response waiting time taken to response to the TCP session request is set in consideration of round trip time (RTT) between the user equipment and the proxy server, except for RTT between the proxy server and the web server.

6. The method of claim 5, further comprising, accessing the web server providing the web page that the user equipment is anticipated to access, based on hypertext transfer protocol (HTTP), to receive the information of the web page, before receiving a HTTP request from the user equipment.

7. The method of claim 5, further comprising:

if the TCP session request is received from the user equipment, receiving information of the web page corresponding to the URL from the web server based on HTTP; and if a HTTP request is received from the user equipment, transferring the received information of the web page as a response to the HTTP request to the user equipment.

8. A proxy server supports a user equipment with a predetermined web browser installed therein to access a web page, the proxy server comprising: a memory configured to store executable instructions; and a processor operably coupled to the memory, wherein the executable instructions cause the processor to:

communicate with the user equipment, a domain name server, and a web server, in order to support the user equipment to access the web page; and receive a uniform resource locator (URL) that the user equipment is anticipated to access for establishing a transmission control protocol (TCP) session between the proxy server and the web server, from the domain name server, transmit a TCP session request to the web server for establishing the TCP session with the web server, to receive a TCP session acknowledge from the web server, receive a TCP session request from the user equipment for establishing the TCP session between the proxy server and the user equipment, and transmit a TCP session acknowledge to the user equipment based on the TCP session between the proxy server and the web server, wherein the URL is forwarded to the proxy server by the domain name server before the proxy server receives the TCP session request from the user equipment, wherein the proxy server establishes a TCP session between the proxy server with the web server based on the URL before the proxy server receives the TCP session request from the user equipment, wherein the TCP session between the proxy server and the user equipment is established based on the TCP session between the proxy server with the web server established before the proxy server receives the TCP session request from the user equipment, wherein the proxy server acquires information of the web page that the user equipment is anticipated to access through the TCP session with the web server, and wherein a timer for a response waiting time taken to response to the TCP session request is set in consideration of round trip time (RTT) between the user equipment and the proxy server, except for RTT between the proxy server and the web server.

9. The proxy server according to claim 8, wherein the processor is configured to access the web server providing the web page that the user equipment is anticipated to access, based on hypertext transfer protocol (HTTP), to receive information of the web page, before receiving a HTTP request from the user equipment.

10. The proxy server according to claim 8, wherein the processor is further configured to:

if the TCP session request is received from the user equipment, receive information of the web page corresponding to the URL from the web server based on HTTP, and if a HTTP request is received from the user equipment, transfer the received information of the web page as a response to the HTTP request to the user equipment.

11. A method in which a domain name server supports a user equipment to access a web page, the method comprising:

receiving, by the domain name server from the user equipment, a request message including a uniform resource locator (URL) that corresponds to the web page which the user equipment is anticipated to access, wherein the request message includes a request for sending an internet protocol (IP) address; and when the IP address is allocated to the user equipment in response to the request message, transferring, by the domain name server, the URL to a proxy server, for establishing a transmission control protocol (TCP) session between the proxy server and a web server by the proxy server, wherein the URL is forwarded to the proxy server by the domain name server before the user equipment transmits a TCP session request to the proxy server, wherein a TCP session is established between the proxy server with the web server based on the URL before the user equipment transmits the TCP session request to the proxy server, wherein a TCP session between the user equipment with the proxy server is established based on the TCP session between the proxy server with the web server established before the user equipment transmits the TCP session request to the proxy server, and wherein information of the web page that the user equipment is anticipated to access is transmitted through the TCP session between the proxy server with the web server.

12. A domain name server supports a user equipment to access a web page, the domain name server comprising: a memory configured to store executable instructions; and a processor operably coupled to the memory, wherein the executable instructions cause the processor to:

communicate with the user equipment and a proxy server, in order to support the user equipment to access the web page; and receive from the user equipment a request message including a uniform resource locator (URL) that corresponds to the web page which the user equipment is anticipated to access, wherein the request message includes a request for sending an internet protocol (IP) address, and to transfer the URL to the proxy server when the IP address is allocated to the user equipment in response to the request message for establishing a transmission control protocol (TCP) session between the proxy server and a web server by the proxy server, wherein the URL is forwarded to the proxy server by the domain name server before the user equipment transmits a TCP session request to the proxy server, wherein a TCP session is established between the proxy server with the web server based on the URL before the user equipment transmits the TCP session request to the proxy server, wherein a TCP session between the user equipment with the proxy server is established based on the TCP session between the proxy server with the web server established before the user equipment transmits the TCP session request to the proxy server, and wherein information of the web page that the user equipment is anticipated to access is transmitted through the TCP session between the proxy server with the web server.

13. The domain name server of claim 12, wherein the user equipment uses a predetermined web browser to access the web page via an internal network.

14. The method of claim 1, wherein the user equipment uses a predetermined web browser to access the web page via an internal network.

15. The user equipment of claim 3, wherein the user equipment uses a predetermined web browser to access the web page via an internal network.

16. The method of claim 5, wherein the user equipment uses a predetermined web browser to access the web page via an internal network.

17. The proxy server of claim 8, wherein the user equipment uses the predetermined web browser to access the web page via an internal network.

18. The method of claim 11, wherein the user equipment uses a predetermined web browser to access the web page via an internal network.

\* \* \* \* \*